March 22, 1932.  C. D. BURNEY  1,850,826
STOWAGE OF SPARE WHEELS ON MOTOR ROAD VEHICLES
Filed Sept. 24, 1931
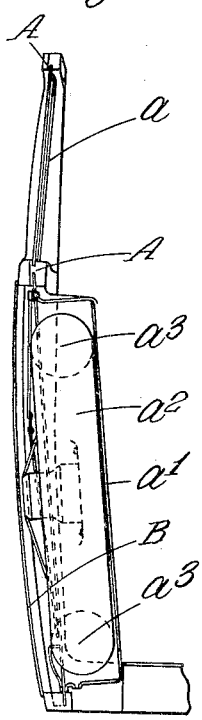
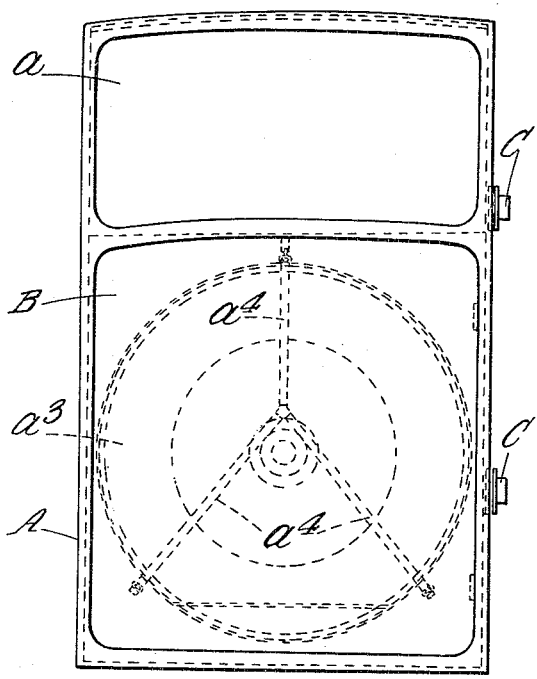
Inventor
Charles Dennistoun Burney
by Cushman Byrnt Derby & Cushman
attys Patented Mar. 22, 1932

1,850,826

UNITED STATES PATENT OFFICE

CHARLES DENNISTON BURNEY, OF WESTMINSTER, ENGLAND, ASSIGNOR TO STREAM-LINE CARS LIMITED, OF WESTMINSTER, ENGLAND, A BRITISH COMPANY

STOWAGE OF SPARE WHEELS ON MOTOR ROAD VEHICLES

Application filed September 24, 1931, Serial No. 564,910, and in Great Britain May 22, 1930.

This invention relates to motor road vehicles of the kind in which a spare wheel is stowed within a compartment formed in the door of the vehicle. In cases where the spare wheel has been located within the door of the vehicle, access to the compartment containing the spare wheel could only be obtained from inside the vehicle, and accordingly, the spare wheel could not be removed without opening the door of the vehicle.

According to the present invention the door, or each door of the vehicle is provided with a compartment for the stowage of a spare wheel or tyre, the tyre or spare wheel being supported in any suitable manner within the compartment, and access to the compartment in the door being obtained by means of a removable or hinged panel forming part of the outside of the door, said panel being adapted to be opened from outside the vehicle.

In order that the said invention may be clearly understood and readily carried into effect the same will now be described more fully with reference to the accompanying drawings in which, Figure 1 is a section through the door and part of the framework of a motor road vehicle of the saloon or enclosed type constructed according to the present invention, and in which, Figure 2 is a side elevation of the door.

A is the door framework and $a$ is a window fitted at the upper part of the door. The lower portion of the door has attached thereto a metal casing $a'$ which provides a compartment $a^2$ within which a spare wheel or tyre $a^3$ is located, the wheel being secured in position within the compartment $a^2$ by straps $a^4, a^4$. B is a hinged or removable panel which forms the outer surface or shell of the lower portion of the door, and, by opening or removing the said panel from outside the vehicle, access to the spare wheel or tyre is obtained.

The chief advantage of the present arrangement is that a spare wheel or wheels can be removed from outside the vehicle without opening the door of the vehicle or disturbing the passengers. Furthermore, the present arrangement has the advantage that in cases where a spare wheel is located inside the door, the window above the compartment containing the spare wheel can be made lower. In previous arrangements, and if the spare wheel is extracted from inside the vehicle with the door shut the base of the tyre had to be located above the floor boards, whereas, according to the present invention, the chassis frame is located inside the compartment contained in the door, so that the floor boards are situated above the bottom of the spare wheel.

The invention is capable of being applied to motor road vehicles of ordinary type, and is also more particularly applicable to motor road vehicles of the enclosed or saloon type wherein all the main protuberances, with the exception of the road wheels are enclosed within the body or framework of the vehicle so that the body portion is undisturbed by external protuberances.

I claim:

A door for motor road vehicles, said door having a frame comprising rigid uprights extending from top to bottom of the door, top and bottom cross-members, and an intermediate cross-member defining with the bottom cross-member and lower portions of the uprights an opening through which a spare tire for the vehicle may be passed, a casing secured to the frame members defining said opening and projecting a substantial distance within the vehicle compartment to provide a space for reception of the tire, the top side of said casing providing an inwardly extending ledge of substantial width, a displaceable outer panel for closing said opening, said panel when in closed position being externally non-protuberant to give an uninterrupted continuous contour to the door exterior, closure means filling the frame opening above said intermediate cross-member, and means for releasably engaging the tire to support it in the casing independently of the outer panel.

In testimony whereof I have affixed my signature:

CHARLES DENNISTON BURNEY.